Nov. 14, 1967 G. L. RICHARDS 3,353,112

FREQUENCY SYNTHESIZING SYSTEM

Filed May 20, 1966 3 Sheets-Sheet 1

INVENTOR.
GLEN L. RICHARDS
BY Raymond L. Owens
ATTORNEY

INVENTOR.
GLEN L. RICHARDS
BY Raymond L. Owens
ATTORNEY

Nov. 14, 1967 G. L. RICHARDS 3,353,112

FREQUENCY SYNTHESIZING SYSTEM

Filed May 20, 1966 3 Sheets-Sheet 3

INVENTOR.
GLEN L. RICHARDS

BY Raymond L. Owens

ATTORNEY

United States Patent Office 3,353,112
Patented Nov. 14, 1967

3,353,112

FREQUENCY SYNTHESIZING SYSTEM

Glenn L. Richards, Webster, N.Y., assignor to General Dynamics Corporation, a corporation of Delaware Filed May 20, 1966, Ser. No. 551,594
5 Claims. (Cl. 331—16)

ABSTRACT OF THE DISCLOSURE

A frequency synthesizer is described which is adapted to accurately maintain the output signal of an oscillator at a pre-selected frequency. The synthesizer includes a decade counter arrangement which receives inputs from the oscillator and which develops an actuation signal when it accumulates a predetermined count which is a function of the pre-selected frequency and means responsive to the actuation signal for generating an output signal for tuning the oscillator, which output signal occurs a predetermined number of cycles, at the oscillators frequency, after the actuation signal.

Figure 1:
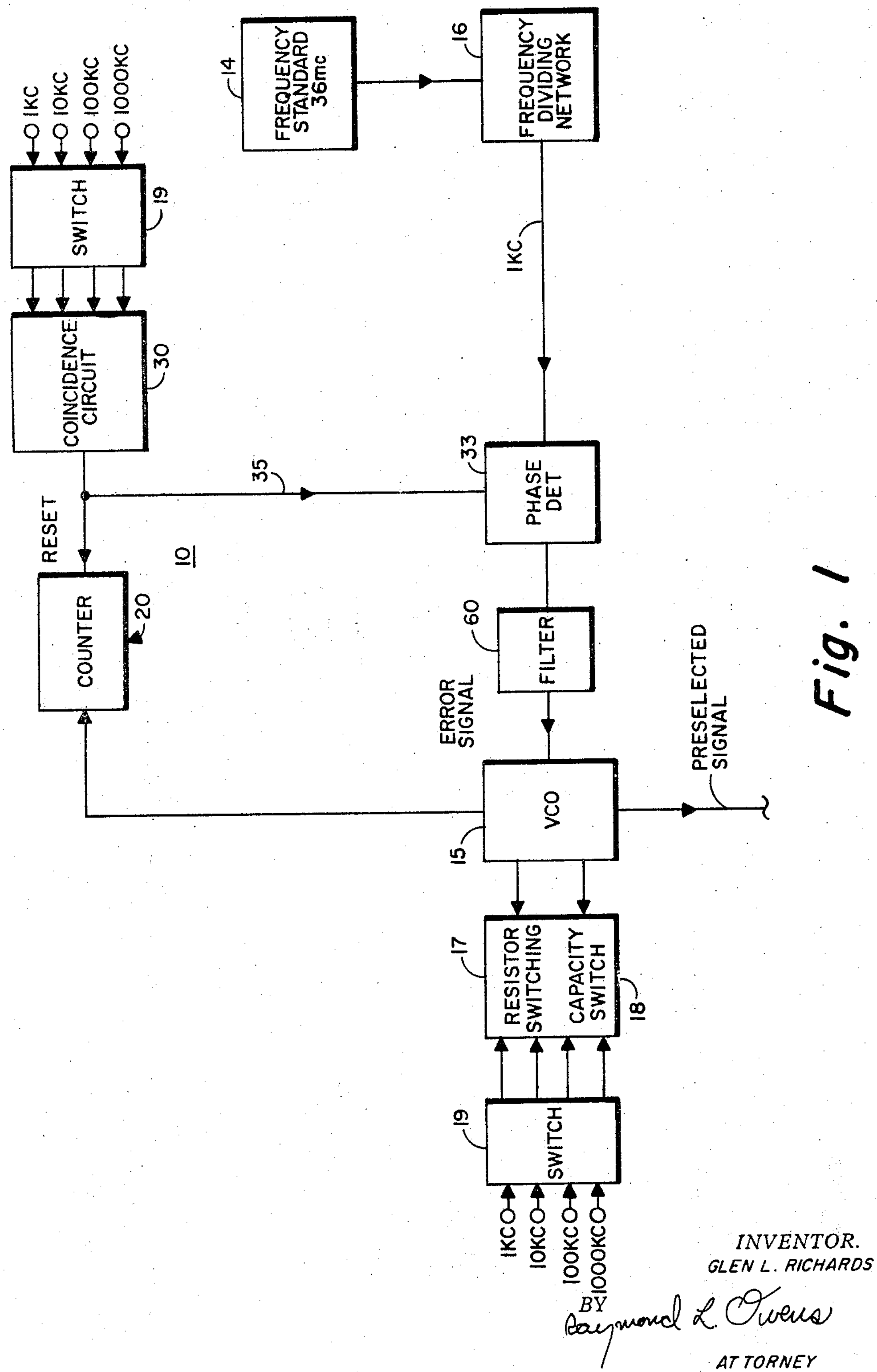

The present invention relates to communication systems, and more particularly to systems for synthesizing a signal of a predetermined frequency from a band of frequency signals.

This invention is especially suitable for providing a system which synthesizes a signal from a large number of frequencies over a wide band and injects that signal into frequency translator means for use in translating a received radio frequency signal into an intermediate frequency signal, or for translating an intermediate frequency into a radio frequency signal.

In synthesizing signals, it is desirable to employ a decimal rather than a binary control arrangement for ease of selection of a desired frequency signal minimizing deviations from the selected frequency signal. Nevertheless, decade counting circuits are subject to a drawback due to a propagating delay caused by the switching stages in a decade counter, and consequently, frequency synthesizing systems employing decade counters are subject to errors. In addition, prior art frequency synthesizers often are complex devices which generate spurious frequencies.

In view of the foregoing, it is an object of the present invention to provide an improved and simplified frequency synthesizer.

It is a further object of the present invention to provide a frequency synthesizer in which frequency errors are reduced.

It is a still further object of the present invention to provide a frequency synthesizing system which employs a digital arrangement making use of high speed decade counting circuits and which arranges these decade counters so that they are not subject to the disadvantages above discussed.

In an exemplary frequency synthesizer which embodies the present invention there is provided an oscillator which is settable to a desired pre-selected frequency and means for providing control signals to the oscillator, which cause it to accurately maintain the pre-selected frequency. More particularly, these means may include a source of precise reference signals, a decade counter arrangement for receiving inputs from the oscillator, coincidence means for generating an output signal when a predetermined number is monitored to be in the counter, and error control means responsive to the reference signal and the output signal generated by the coincidence means for developing and providing an error signal as an input to the oscillator which in response to the error signal locks in at the preselected frequency.

The counter arrangement employed includes a plurality of decade counters connected in tandem, the first counter being adapted to receive signals directly from the oscillator, whereas inputs to the remaining decade counters each are provided by carry gates. Preferably, each carry gate will provide its output signal at the appropriate time directly upon receiving a pulse from the oscillator.

Figure 2A:
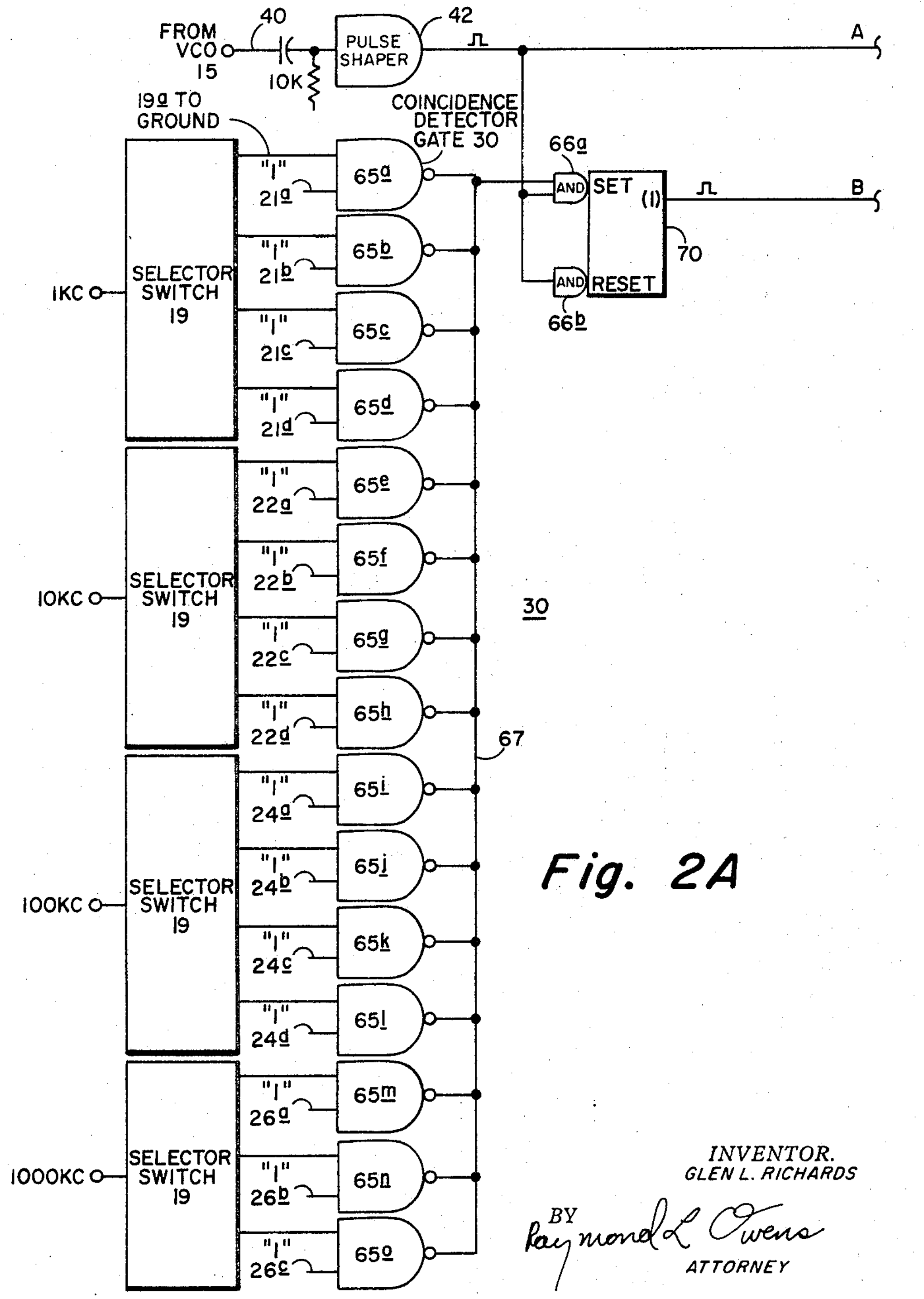
Figure 2B:
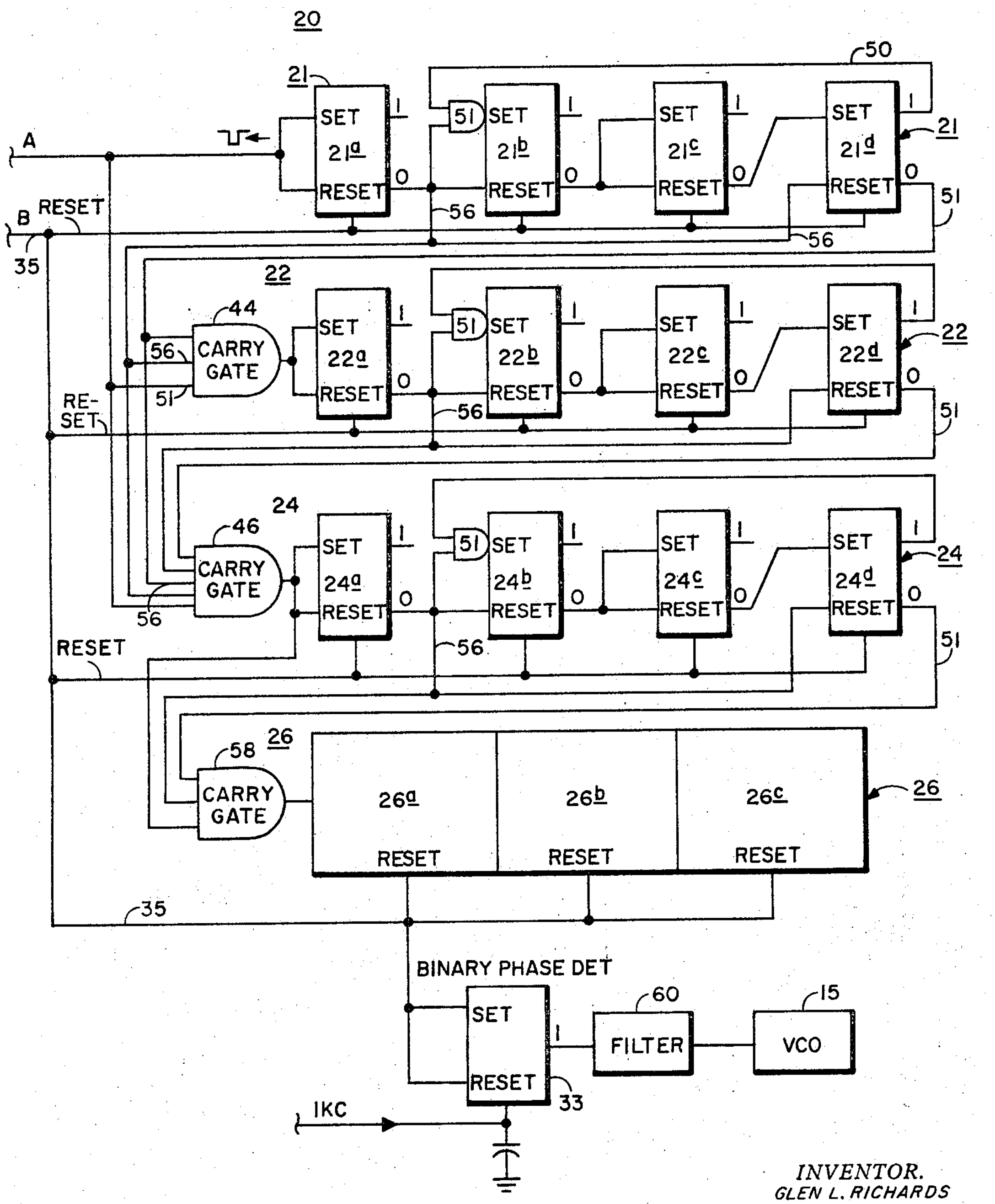

The invention, itself, both as to its organization and method of operation as well as the additional advantages thereof will become more readily apparent from a reading of the following description in connection with the accompanying drawings in which:

FIG. 1 is a block diagram of an exemplary frequency synthesizing system in accordance with the present invention, FIG. 2A is a detailed block diagram of a portion of the frequency synthesizer shown in FIG. 1 depicting the coincidence means, and FIG. 2B is a detailed block diagram of the decade counters shown in FIG. 1.

Referring more particularly to FIG. 1 of the drawings, there is shown a frequency synthesizer 10 adapted to cover a wide frequency band which, for example, only may be from 2 mc. to 6.999 mc. In addition, the synthesizer 10 can produce precise signals between these limits with the above-indicated range being covered continuously in 1 kc. steps.

As shown in FIG. 1, there is provided a frequency standard 14, which by way of example only is indicated as providing a signal at 3.6 mc. The frequency standard 14 may be of the type known in the art which includes a crystal controlled oscillator having its crystal contained in a temperature-controlled oven. The frequency standard 14 moreover includes a pulse shaper circuit for driving a frequency dividing network 16, which is provided with several frequency dividing flip-flop chains connected in series with each other and arranged to provide a 1 kc. output pulse train used as a reference signal in this invention. Reference may be had to Van Sandwyk, Patent No. 3,071,676 issued Jan. 1, 1963, for a more detailed discussion of a frequency standard which may be used in this invention.

The 1 kc. signal is used as a reference to maintain the output of a voltage controlled oscillator 15 which is adjusted to a pre-selected frequency by means of a resistor switch 17 and a capacitor switch 18. The switches 17 and 18 are in turn settable by four separate knobs of a frequency selector switch 19, which knobs respectively correspond to 1 kc., 10 kc., 100 kc. and 1,000 kc. digits of the pre-selected frequency. Both the oscillator 15 and the means for setting its frequency will be described in more detail hereinafter.

The synthesizer 10, as shown in FIG. 2, includes a counter 20 having a chain of decade counters 21, 22 and 24 and a shift counter 26 (FIG. 2B), all of which respectively correspond to the units 10's, 100's, and 1,000's digits of the signal provided by oscillator 15. Each stage in the counter 20 is formed by a flip-flop, with the counters 21, 22 and 24 each containing four flip-flops, whereas the shift counter 26 includes three flip-flops.

The selector switch 19, which may be of the wafer variety, is adjustable by means of the aforementioned 1 kc., 10 kc., 100 kc., 1,000 kc. knobs which not only set the frequency of the oscillator 15 but also sets a coincidence gate 30 adapted to monitor the counter 20. In addition, the frequency synthesizer 10 includes a binary phase detector flip-flop 33 which is actuated by an output of the coincidence gate 30 and the 1 kc. reference signal from the frequency divider 16. The operation of the phase detector 33 will be described in more detail hereinafter.

In accordance with the present invention, the basic operation of the frequency synthesizer 10 may be expressed by the following mathematical relationship:

$f=X\cdot{}^{1}$kc. wherein $f$ is the desired pre-selected frequency of the synthesizer 10 and X is a pre-determined number which is set by the switch 19 and monitored by the coincidence gate 30.

If for instance the pre-selected frequency is to be 2,999 mc., the switch 19 will be set so that the coincidence gate 30 will recognize a count of 2,999 and then provide an output pulse to the binary phase detector 33. If there is a frequency error or deviation of the oscillator 15 from the pre-selected 2,999 mc., the phase detector 33 recognizes this frequency error by comparison of the phase of the coincidence gate output with the reference signals of exactly 1,000 pulses per second and provides an error voltage which locks the oscillator 15 in at the pre-selected frequency.

Inasmuch as the reference signal is 1 kc., the system 10 may be used to synthesize signals which vary in frequency by 1 kc. increments. By adding additional counter stages and by reducing the frequency of the reference signal, the number of frequency signals that may be synthesized may be increased in number. Therefore, if the reference frequency was for example 100 c.p.s. and an additional decade counter stage was included, the frequency signal which could be synthesized would be separated by 100 cycle steps.

The decade counters 21, 22 and 24 will now be considered. Referring to FIG. 2B, each of the decade counters is comprised of four stages of flip-flops (*a–d*), with each stage having two inputs and two outputs. The following convention will be used: a pulse which actuates the set input of a flip-flop will render its output line designated "1" on, whereas a pulse which actuates the input indicated re-set will turn on the output designated "0." Purely for the purpose of illustration and without limiting the invention to their use, it has been found that logic modules MC type 308, manufactured by the Motorola Corporation can be used successfully for all of the stages of the counter 20. Each MC 308 flip-flop requires a low to a high transition for an input to be effective as a trigger for the flip-flop. Moreover when an output of a flip-flop is on, it will be at a high potential level, whereas if it is off its potential will be low.

Momentarily turning to FIG. 2A, pulse signals from the oscillator 15 are delivered by a lead 40 to a pulse shaping circuit 42 which provides a square wave output signal in response to an input sine wave signal from the oscillator 15. Output pulses from the circuit 42 are injected into the set and re-set inputs of the first stage 21*a* of the decade counter 21 and into the carry gates 44 and 46 which are associated with the first stage of the second and third decade counters 22 and 24 respectively.

The first input to the decade counter 21 (when it holds a zero count) sets the flip-flop 21*a* to a "1" count, whereas the second input will cause the first flip-flop stage 21*a* to switch to a "0" count, which action actuates the set input of the second stage 21*b* as the output of the "0" line translates from a low to high condition. The decade counter 21 thereafter, in the well known manner, counts up to the number 8 at which time the "1" output line 50 of the fourth stage 21*d* will be high, thereby actuating a gate 51 which inhibits the set input of the second flip-flop stage 21*b*.

In operation the gate 51, which may be a logic module MC type 301, manufactured by the Motorola Corporation, provides a high output when either of its inputs from the "0" output of the stage 21*a* or the "1" output of the stage 21*d* is high. On the other hand, it provides a low output when both of its inputs are low. Returning to the counter operation, when the counter 21 holds an "8" count, the "0" output line 51 of the stage 21*d* provides a low input signal to the carry gate 44. The gate 44 may also be provided by the afore-noted logic modules MC type 301. Upon the next output pulse of the circuit 42, the set input of the first stage 21*a* of the counter 21 is actuated, and the flip-flop 21*a* switches over to its "1" output. The decade counter 21 now holds a count of "9." At this time a low level input is also provided to the AND gate 44 by a lead 56, connected to the "0" output of the stage 21*a*. The gate 44 is now enabled and provides an actuating signal to the first stage 22*a* when the next output from the circuit 42 goes from a low to a high condition.

Reviewing the operation of the gate 44, when both the inputs to the carry gate 44 from the decade counter 21 are in a low condition, the gate 22 is enabled so that it responds to input signals from the circuit 42. Accordingly when either input from the counter 21 is high, the gate 44 will be disabled. The other carry gates, 46 and 58, function in the same manner as the gate 44 so that their detailed description need not be set forth when they are discussed hereinafter.

After a signal has been injected into the counter 22, the next input from the pulse shaper 42 is injected only in to the first decade counter 21. The reason for this is that the output of the gate 44 at this time is high as the previous pulse turned on the "0" output of the stage 21*a* thereby disabling the gate 44.

Continuing its operation, the counter 20 will count up until the time when each of the counters 21 and 22 hold a count of "9." Upon recognition of the next pulse, the 100th pulse, from the shaper circuit 42, the carry gate 46 provides the first input signal to the decade counter 24. It is to be noted that the three decade counters 21, 22 and 24 are identical in construction and therefore it should be clear that at this time the gate 46 will be enabled as its inputs from the first stages 21*a* and 22*a* and the last stages 21*d* and 22*d* of the preceding counters 21 and 22 respectively are all in a low condition.

The counter 26 will first be signaled when its input gate 58 is enabled. This occurrence takes place when the gate 58 recognizes an input from the carry gate 46 and the first stage 24*a* and the last stage 24*d* of the counter 24 are in a low condition. The construction of the shift counter 26 will not be discussed, as any well known arrangement may readily be employed with the present invention. It will be noted, however, that the aforementioned logic modules MC 308 may be employed in constructing the counter 26.

The above arrangement eliminates the relatively long delays found in prior art constructions where one decade counter serially actuated its following decade counters. With the present invention, the carry gate associated with the decade counter is enabled, at the appropriate time when all preceding decade counters hold a count of "9," and responds directly to a clock pulse to actuate its associated decade counter.

The counter 20 functions right along until the coincidence gate 30 monitors the predetermined number, previously discussed, to be present in the counter 20, at which instant the gate 30 actuates its output line 35, providing a reset signal to each stage of the counter 20 and an input signal to the set and reset inputs of the binary phase detector flip-flop 33. As shown, the 1 kc. reference signal is also provided as a reset input to the flip-flop 33.

Connected to the "1," the output lead line, of the gate 33 is a filter network 60 which removes all AC components and which produces a DC voltage error control voltage to the oscillator 15.

More particularly, the binary phase detector 33 receives set and re-set pulses from the line 35, which of course is actuated by the flip-flop 70. In addition re-set pulses are provided to the flip-flops 33 by the 1 kc. reference signal. A phase error signal is provided from the "1" output of the flip-flops 33 and directed to the filtering circuit 60 which removes all AC components and provides a DC error control voltage signal to the oscillator 15.

The arrangement is such that the 1 kc. signal should be applied out of phase with the set input to the flip-flop 33, which would effectively produce an output signal from the "1" line of about a 50% of a maximum possible output signal. Any deviation in this timing would cause a DC voltage signal from the filter circuit 60 to vary from the 50% output level signal. The oscillator 15 in response to the signal would correct its output frequency. This invention is not limited for use with this type of detector. Other types of detectors well known in the art may also be used in the practice of this invention.

Focusing attention on the coincidence gate 30 shown in detail in FIG. 2A, it includes a plurality of NAND gates 65, each of which monitors a specific flip-flop in the counter 21, with each group of four NAND gates being adapted to monitor a different stage of a decade counter. Considering the first NAND gate 65*a*, it is provided with an input line settable in either a high voltage or low condition by the 1 kc. knob of the switch 19. The gate 65*a* also receives an output line which is connected to the "1" output of the flip-flop 21*a*. The operation of each NAND gate is as follows: if either of its inputs is high, its output will be low, but on the other hand, both inputs must be low for the output of the gate 65 to be high. Logic modules MC 310, manufactured by the Motorola Corporation may readily be used to provide this logic sequence.

For a specific example, if the coincidence gate 30 is to monitor a count of "1" in the first stage of the decade counter 21, then the input line 19*a* from the selector switch 19 will be switched from its normally high potential to a low potential, the remaining inputs from the selector switch 19 to the other NAND gates 65*b* and 65*d* being maintained at a high potential. Consequently, the gate 65*a* will have a high output, while the gates 65*b*, 65*c* and 65*d* will conversely have a low output. Upon the first flip-flop stage 21*d* switching to a "1" count, the input from stage 21*a* to the first NAND gate 65*a* will switch from a low potential to a higher voltage level, and thus the output of the NAND gate 65*a* will be gated to a low potential. Inasmuch as the inputs to each of the remaining NAND gates 65 are at different potential levels, these gates will similarly provide a low level output.

By utilizing this type of logic, as should now be clear, each and every one of the NAND gates must provide a low output level for an enabling low level signal to be delivered by a lead 67 to an AND gate 66*a* located at the set inputs of a pulse generating flip-flop 70. Both the AND gate 66*a* and an AND gate 66*b* disposed at the re-set input of flip-flop 70 function in an identical fashion as the AND gates 51, and the flip-flop 70 functions in the same manner as the flip-flop gates in the counter 20.

After the gate 30 has monitored the predetermined number to be in the counter 20, upon recognization of a pulse from the pulse shaper circuit 42, a reset flop-flip 70 will provide a pulse by way of the lead 35 to all of the flip-flops in the counter 21 and to the binary phase detector gate 33. The next input pulse from the pulse shaper 42, of course, gates off the output lead 35 of the flip-flop 70, inasmuch as it actuates the AND gate 66*b* disposed at the reset input of the flip-flop 70.

The oscillator 15 may be embodied by a conventional tunable Colpitts or Clapp type oscillator and should include tuned circuits having elements such as variable inductors, resistors or capacitors therein which may be manually adjusted. In the illustrated embodiment, the 1 kc. and 10 kc. control knobs of the switch 19 adjust the resistor switch 17 in accordance with the frequency desired from the synthesizer 10, whereas the capacitor switch 18 is controlled by the 100 kc. and 1,000 kc. knobs and used to switch different values of capacitance into the different circuits of the oscillator 15. Thus, by means of resistor and capacitor switches 17 and 18, the oscillator 15 may be tuned near the desired pre-selected frequency.

In operation, the selector switch 19 is adjust to some predetermined value which will set the oscillator 15 near the pre-selected frequency. The switch 19 also adjusts the various stages of the NAND gates 65 to provide an output upon recognization of the predetermined number which is equal to the desired pre-selected frequency divided by the reference signal, which in this instance is 1 kc. Variations in the frequency of the oscillator 15 will be detected by the binary phase detector 33 and provided as an input to the filter network 60; the filter 60 in turn provides an error control signal to the voltage oscillator 15 locking in the oscillator 15 at the desired pre-selected frequency.

From the foregoing descriptions it will be apparent that there has been provided an improved synthesizing system which is especially suitable for use in providing signals in radio type receivers and transmitters. Although one embodiment of the system has been shown and described, it will be appreciated that variations and modifications therein and the components thereof will, undoubtedly, become apparent to those skilled in the art. For example, in the disclosed embodiment there will be a delay of two cycles involved with the resetting of the counter 20 by the flip-flop 70. Therefore, the first decade counter 21 should be preset with the number 2, which would compensate for the two cycles not counted during the reset operation. Thus, each time the counter 21 is reset by the flip-flop 70, it would hold a count of 2. Accordingly, the foregoing descriptions should be taken merely as illustrative and not in any limiting sense.

What is claimed is:

1. A system for synthesizing a signal pre-selected from a frequency band comprised of a plurality of precise frequencies spaced a predetermined number of cycles from each other in said band, said system comprising (a) means for generating a reference signal having a precise predetermined frequency, (b) oscillator means tunable over said band for providing said pre-selected signal, (c) counter means for counting the cycles produced by said oscillator and having a plurality of flip-flops arranged in a plurality of counter stages, (d) said counter means including a first decade counter actuated by said oscillator means, a second decade counter, and a first carry gate coupled to said second decade counter and being adapted to actuate said second decade counter when enabled, said first carry gate being enabled upon receiving the next pulse from said oscillator means after it receives signals from at least two stages of said first decade counter indicating a count of "9" being held in said first decade counter, (e) coincidence means including a plurality of monitoring circuits each connected to a different one of flip-flops in said counter stage and adapted to yield an actuation signal upon monitoring of a predetermined number in said counter, and gate means responsive to said actuation signal and said reference signal at a precise number of cycles at the oscillator frequency after said actuation signal to develop an output signal adapted to reset all of the stages of said counter means, (f) means for setting said coincidence means to said predetermined number which when multiplied by the frequency of said reference signal is equal to said pre-selected frequency, and (g) means responsive to said output signal for providing an error signal to control the tuning of said oscillator to lock it in at said pre-selected frequency.

2. The invention as defined in claim 1 wherein said first carry gate receives inputs from the first and last stages of said first decade counter, said first stage input corresponding to a count of "1" and said last stage input corresponds to a count of "8."

3. The invention as defined in claim 2 wherein said counter includes a third decade counter and second carry gate coupled thereto and being adapted to provide an input to said third decade counter from said oscillator when it receives inputs from said oscillator at the time when the first and last stages of said preceding decade counters indicate the recognization of a count of "9" in their respective counters.

4. The invention defined in claim 1 wherein said means for tuning said oscillator is a phase detecting means which includes a flip-flop which receives inputs from said coincidence means and said reference signal and means for deriving an error control signal in response to the output of said phase detecting flip-flop to lock said oscillator in at said pre-selected frequency.

5. The invention as defined in claim 1 wherein said coincidence means includes a plurality of gates each of which monitors a flip-flop stage of said counter, and switching means for setting an input to each of said monitoring gates, all said monitoring gates being adapted to provide the same voltage output level upon recognition of said predetermined number.

References Cited

UNITED STATES PATENTS

| | | | |
|---|---|---|---|
| 3,130,376 | 4/1964 | Ross | 331—18 |
| 3,217,267 | 11/1965 | Loposer | 331—16 |

ROY LAKE, *Primary Examiner.*

JOHN KOMINSKI, *Examiner.*